United States Patent Office.

JULIUS ALTSCHUL, OF BERLIN, GERMANY, ASSIGNOR TO THE ACTIEN-GESELLSCHAFT FÜR ANILIN FABRIKATION, OF SAME PLACE.

COMPOUND OF GELATIN AND TANNIN AND PROCESS OF PRODUCING SAME.

SPECIFICATION forming part of Letters Patent No. 658,747, dated October 2, 1900.

Application filed November 11, 1898. Serial No. 696,161. (Specimens.)

*To all whom it may concern:*

Be it known that I, JULIUS ALTSCHUL, of Berlin, in the Kingdom of Prussia, German Empire, have invented new and useful Improvements in the Production of a New Compound of Gelatin and Tannin; and I do hereby declare that the following is a full, clear, and exact description thereof, which will enable others skilled in the art to which it appertains to make and use the same.

This invention relates to the production of a new compound of gelatin and tannin suitable for use as an intestinal astringent. Hitherto gelatin tannin compounds which could be used in medicine as tannin substitutes have not yet been described, and several difficulties had to be overcome in order to obtain a product adapted for such medicinal use. Thus it is well known that the precipitate obtained from aqueous solutions of gelatin and tannin is subject to putrefaction. I have now discovered that this property is essentially caused by the water retained by the precipitate. I further have found that if this water is entirely removed a stable and non-putrescible product is obtained. Another difficulty, however, arises from the behavior of the gelatin tannin precipitate when exposed to heat. When this precipitate, after removing the mother-lyes by pressing off, is heated—for instance, on the water-bath—it melts at relatively-low temperature, forming a dark-colored viscous and leather-like mass. By heating the same for a long time on the water-bath it is possible to remove the water; but the product obtained in this way is strongly colored and does not possess the properties of pure gelatin tannate. Thus it assumes a disagreeable taste and smell when heated above 100° centigrade—for instance, in order to sterilize it—whereas pure gelatin tannate can be heated to 100° to 130° centigrade without any decomposition. I have now succeeded in totally avoiding the partial decomposition caused by the melting of the raw gelatin tannin precipitate by allowing the latter to dry at ordinary temperature for a sufficiently long time previous to further drying it in the heat. I have found that when most of the water retained in the precipitate has thus been removed by evaporation at ordinary temperature the remaining product can afterward be completely dried at 100° centigrade without melting or decomposing. In this manner I obtain an almost colorless substance free of taste and smell and being not decomposed when heated to temperatures of 100° to 130° centigrade. The pure and dry gelatin tannate thus prepared contains about forty-five per cent. of tannin. By this high percentage of tannin my new product is distinguished from the glue-tannate described by Böttinger, (*Liebig's Annalen*, 244, 228,) which only contains thirty-four per cent. of tannin.

I have now found that the new product which I obtain from gelatin and tannin in the manner above described possesses the valuable property of being nearly insoluble in the juices of the stomach, while it dissolves readily in the juices of the intestines. It can therefore be applied with great advantage as an intestinal astringent, which has no effect in the stomach, but will only act in the bowels.

The following example may illustrate the production of the new product: The precipitate obtained by adding two hundred litres of a five-per-cent. solution of tannic acid to one thousand litres of a one-per-cent. solution of gelatin while constantly stirring is filtered off, washed repeatedly with water until the excess of tannic acid is removed, and pressed. The cake obtained is coarsely ground, spread out in thin layers, and allowed to dry at 20° to 25° centigrade and at ordinary or at reduced pressure until a sample does not melt any more when heated on the water-bath. The mass is then ground to a powder and completely dried at 100° centigrade. If desirable, the product can finally be sterilized by heating it for several hours at about 105° to 110° centigrade.

Having thus described my invention and in what manner it can be performed, I declare that what I claim is—

1. The compound of gelatin and tannin herein described containing a nearly-constant proportion of forty-five per cent. of tannin and fit for use as an intestinal astringent, being nearly insoluble in the gastric juice, but readily soluble in the juices of the intestine, forming an almost colorless powder, free of taste and smell, not putrescible, very sparingly soluble in water and diluted acids, more readily soluble in alkaline liquids, being not decomposed by heating at temperatures from 100° to 130° centigrade, substantially as described.

2. The within-described process of obtaining a compound of gelatin and tannin for use as an intestinal astringent, said process consisting in mixing diluted aqueous solutions of pure commercial gelatin and tannin (gallotannic acid), pressing off the precipitate produced, allowing the same to dry at ordinary temperature, until a sample does not melt when heated on the water-bath, and finally completely drying the product at about 100° centigrade, substantially as described.

In witness whereof I have hereunto signed my name, this 26th day of October, 1898, in the presence of two subscribing witnesses.

JULIUS ALTSCHUL.

Witnesses:
C. H. DAY,
HENRY HASPER.